(12) United States Patent
Li et al.

(10) Patent No.: US 7,268,875 B2
(45) Date of Patent: Sep. 11, 2007

(54) METHOD AND APPARATUS FOR OPTICALLY MEASURING ABSOLUTE DISPLACEMENT

(75) Inventors: Wei Li, Hangzhou (CN); Sheng Lu, Hangzhou (CN); Yaojun Wang, Hangzhou (CN)

(73) Assignee: Zhejiang University, Zhejiang (CN)

( * ) Notice: Subject to any disclaimer, the term of this patent is extended or adjusted under 35 U.S.C. 154(b) by 390 days.

(21) Appl. No.: 10/897,503

(22) Filed: Jul. 23, 2004

(65) Prior Publication Data

US 2005/0018204 A1 Jan. 27, 2005

(30) Foreign Application Priority Data

Jul. 24, 2003 (CN) ............................. 03 1 41869

(51) Int. Cl.
*G01J 4/00* (2006.01)
*G02F 1/01* (2006.01)
(52) U.S. Cl. ....................... 356/364; 250/225
(58) Field of Classification Search ............... 356/364, 356/366–368, 370, 614; 250/225
See application file for complete search history.

(56) References Cited

U.S. PATENT DOCUMENTS 3,474,255 A * 10/1969 White ................. 250/225

2003/0095257 A1 * 5/2003 Wijntjes et al. ............ 356/364

FOREIGN PATENT DOCUMENTS

CN ZL98106753.0 3/1998

OTHER PUBLICATIONS

Li, W., "Research on the Principle and Method of Polarized Light Displacement Sensor," Chinese Journal of Scientific Instrument, vol. 20, No. 3 (Jun. 1999).

* cited by examiner

*Primary Examiner*—Gregory J. Toatley, Jr.
*Assistant Examiner*—Marissa J Detschel
(74) *Attorney, Agent, or Firm*—Synnestvedt & Lechner LLP

(57) ABSTRACT

A method and apparatus using two sets of polarized light detection systems are disclosed for optically measuring absolute displacement. In the first detection system a step motor is controlled to drive an analyzer to trace synchronously the displacement being measured by comparison of the magnitude of the intensity of two orthogonal light beams and then the number of control pulses from the step motor becomes a value of the displacement measured; and by comparison with the magnitude the intensity of a plurality of light beams with phase difference from a plurality of light paths in the second polarized light detection system the section of system operation is ascertain and consequently the absolute displacement is detected and measured.

11 Claims, 3 Drawing Sheets

METHOD AND APPARATUS FOR OPTICALLY MEASURING ABSOLUTE DISPLACEMENT

FIELD OF THE INVENTION

The present invention relates to a method and apparatus for optically measuring absolute displacement, particularly a method and apparatus using polarized light detection for measuring absolute displacement.

BACKGROUND OF THE INVENTION

Linear displacement or angular displacement is a basic physical value. Displacement sensors are extensively used in scientific research and industrial processes. Most of the displacement sensors being used today are potential type and photoelectric encoder type. Potential type displacement sensors are simple in structure. Being a traditional contact type sensor available at low cost, potential type displacement sensors' service life is short, and their accuracy and reliability are low. Photoelectric encoder type displacement sensor can measure angular displacement directly, and it can measure straight line displacement through a mechanical converter as well. However, its structure is complicated, and its production cost is high. Polarized light detection type displacement sensor can be designed with an external converter same with or similar to photoelectric encoder type displacement sensor, but its structure for the sensor portion is simple and its production cost is relatively low.

One of the basic issues needs to be solved for polarized light detection type displacement sensor is its inherent non-linearity, a revealed by Malus Law. The solution available today is by pre-calibration on mechanical components or by linearization through electronic circuit. However, pre-calibration would bring the need of a quite complicated mechanical structure, and the result of calibration would depend on mechanical precision. On the other hand, linearization of measurement data requires A/D, micro-controller and means the need of a complicated electronic circuit. Another basic issue needs to be solved for polarized light detection type displacement sensor is the drifting of light source intensity. The effect of the existing solutions, such as light feedback and temperature compensation, is very limited. The third issue needs to be solved for polarized light detection type displacement sensor is wide range measurement. The solution being used now is the utilization of the cyclic property of polarized light detection, which requires a continuous processing on the photoelectric signal, and means an increase of system complication and cost. For instance, the cost of absolute photoelectric encoder is much higher than incremental photoelectric encoder. The way to create a wide range absolute displacement sensor by using polarized light detection is an important issue needs to be solved.

SUMMARY OF THE INVENTION

The main objective of the present invention is to provide a wide range absolute displacement sensor using polarized light detection, differential comparison as well as servo principle. By detecting the light intensity variation caused by the displacement being measured and controlling a step motor to servo-trace the turning angle caused by the displacement being measured, the problem of measuring the displacement is converted to counting the control pulses of the step motor. The working point is always maintained at a selected point having a good linearity to eliminate the non-linear error in the system and to enhance the accuracy of measurement. The influence due to the light-intensity drift is eliminated by an orthogonal differential polarization detection system. A wide measuring range is achieved by a servo-tracing method. A multi-light path structure in combination with a corresponding detection method is applied to measure wide range absolute displacement to eliminate the defects in the prior art.

To achieve the above objective, the principle applied by the present invention is: first, linear displacement X to be measured is converted to angular displacements $\theta_1$ and $\theta_2$ by a mechanical structure linearly. The angular displacement $\theta_1$ becomes an included angle between the polarization axis of a polarizer and the polarization axis of an analyzer, and $\theta_2$ becomes an included angle between the polarization axis of a polarizer and the polarization axis of another analyzer. According to Malus Law, $\theta_1$ has a certain relationship with the light intensity $J_1$ passing through the analyzer in the analyzer system, i.e., $$J_1 = J_0 \cos^2 \theta_1 \quad (1)$$

Wherein $J_0$=light source intensity.

If the same light source is used by another analyzer system, and these two light paths are symmetrical, then similarly $$J_2 = J_0 \cos^2 \theta_2 \quad (2)$$

For the best linearity, $\theta_1$ is preset as 45° and $\theta_2$ is preset as 135°, they are orthogonal (the difference is 90°), and thus $J_1=J_2$. When the linear displacement X being measured is operated continuously so that the two polarizers generate an angular displacement $\theta$ at the same time, generally $J_1 \neq J_2$. According to the two photoelectric signals, the two analyzers are driven by the step motor to turn for a degree $\theta'$, and then the expressions for $J_1$ and $J_2$ can be obtained:

$$J_1 = J_0 \cos^2 (45° + \theta - \theta') \quad (3)$$

$$J_2 = J_0 \cos^2 (135° + \theta - \theta') \quad (4)$$

When $\theta=\theta'$, $J_1=J_2$, and vice versa. In other words, when the difference between two photoelectric signals from two respective light paths is zero, it means that the turning angle driven by the step motor is equal to the turning angle caused by the input displacement. The number of control pulse from the step motor is an accurate value of the displacement being measured, and can be applied to correspond to a very large displacement. In the dual light path orthogonal differential comparison structure with a same light source, when the light intensity is drifting, the longitudinal coordinate of the preset working point (the point when the two photoelectric signals from the two respective light paths become equal) varies, but its transverse coordinate (angular displacement) remains unchanged. That shows that the system is resistant to light source intensity drifting. To assure the two analyzers are orthogonal, two polarizers with their respective polarization axis perpendicular to each other are used to form a dual polarizer.

Moreover, to provide a capacity for measuring wide range absolute displacement, a symmetric multi-light path polarized light detection system with an appropriate detection method and circuit is provided for the present invention.

The technical solution applied in the present invention comprises:

(1) A polarized light detection system I, comprising a first light source; a first wheel with a coaxially mounted a first polarizer; an orthogonally mounted outer-ring and inner-ring dual analyzer co-axially mounted on a second wheel with two photoelectric detectors on another side of the dual analyzer; a first comparison amplifier with two input terminals connecting to the output terminals of the photoelectric detectors respectively; a signal processing and control device with an input terminal connecting to the output terminal of the comparison amplifier; a motor driver with an input terminal connecting to the output terminal of the signal processing and control device; and a step motor connected to the output terminal of the motor driver to drive the second wheel to rotate the dual analyzer;

(2) A polarized light detection system II, comprising: a second light source, a second polarizer co-axially mounted on a third wheel, an analyzer assembly symmetrically distributed and co-axially mounted on a fourth wheel with corresponding photoelectric detectors mounted on another side of the analyzer assembly; and a second comparison amplifier with a plurality of input terminals each connecting to the output terminal of a corresponding photoelectric detector while its output terminal is connecting to the signal processing and control device.

(3) The third wheel is engaged with or frictionally coupled to the first wheel to rotate the polarizer mounted on it, and thus provide a turning angle between the polarizer and analyzer assembly proportional to the displacement being measured.

During the measurement the displacement being measured causes the first wheel in the mechanical conversion structure to rotate, which drives polarizer in the polarized light detection system I to turn for an angle, the light source emits a light beam to pass through the polarizer and the dual analyzer, and then reach two photoelectric detectors. The output terminals of these two photoelectric detectors are respectively connected to the two input terminals of the comparison amplifier, and the output terminals of the comparison amplified are connected to the signal processing and control device respectively. Output from the signal processing and control device is connected to the input terminal of the motor driver, and output terminal of the motor driver is connected to the step motor so as the step motor drives the wheel to turn the dual analyzer for a degree same with the polarizer. The signal processing and control device produces the control pulses to drive the step motor according to the light intensity signals. In the detection system II, the third wheel is engaged with, or frictionally coupled to the first wheel in the detection system I so that after the rotation of the second polarizer, a turning angle proportional to the displacement being measured is obtained between the polarizer mounted on the third wheel and the analyzer assembly. The four photoelectric detectors detects the varying light intensity caused by such turning angle according to the Malus Law and then provide outputs to the signal processing and control device so that the system can measure absolute displacement.

In comparison with the prior arts, the present invention has the following advantages:

(1) Non-contact sensor to provide reliable operation and long service life.

(2) Servo-comparison principle places the working point at a point where linearity is good to solve the inherent non-linearity problem in the optical system.

(3) Dual light path orthogonal differential comparison system utilizing a same light source eliminates the problem of light source intensity drifting problem.

(4) Capable to measure wide range absolute displacement, upon disconnection of power and discretional displacement.

(5) Servo-comparison type displacement sensor in an integrated and simple structure for optical, mechanical and electronic components, and brings a high performance to price ratio.

DETAILED DESCRIPTION OF THE PREFERRED EMBODIMENT

Figure 1:
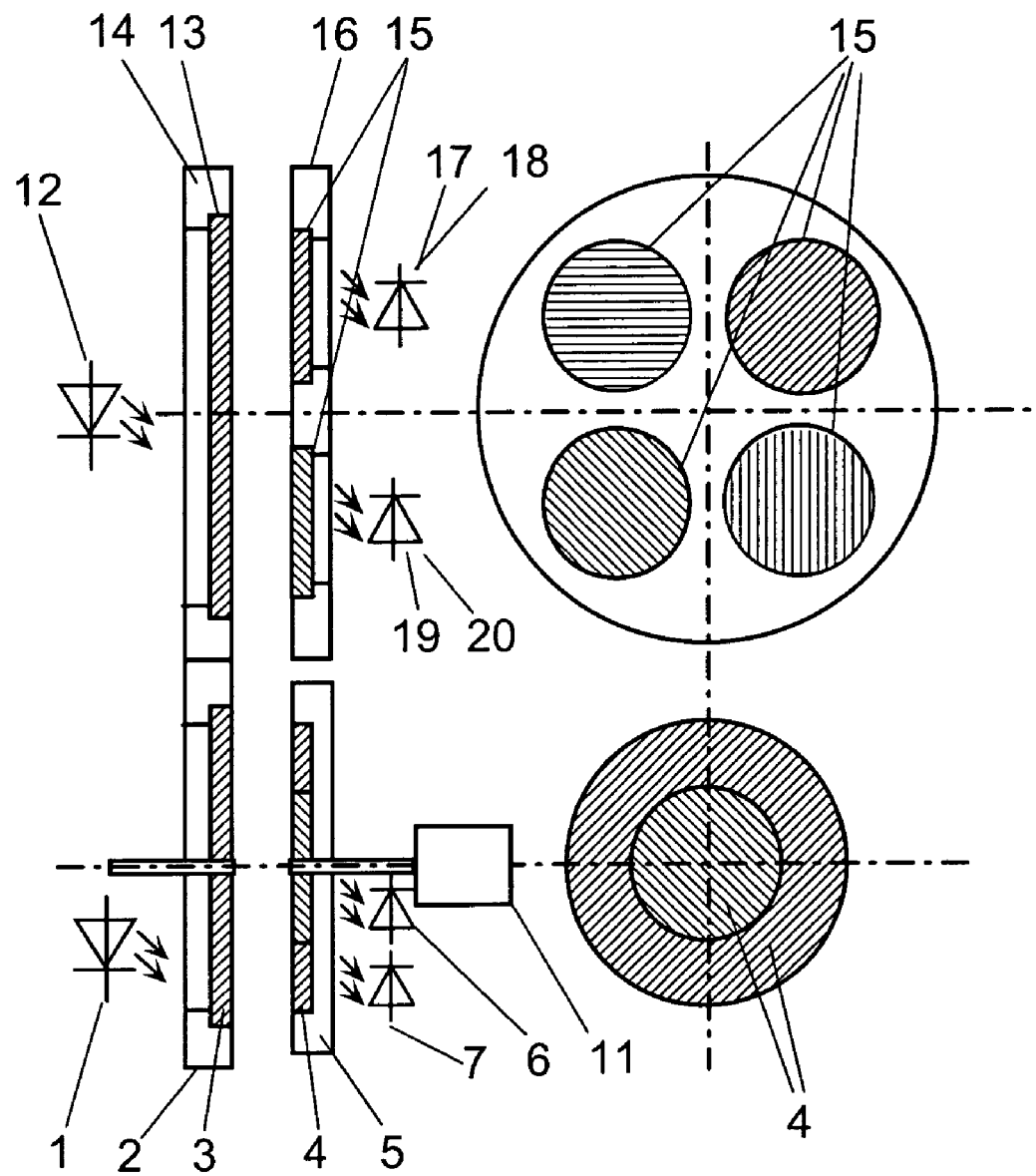
FIG. 1 illustrates a structure of light path for an absolute displacement sensor using polarized light detection according to the present invention.

As shown in FIG. 1, the present invention comprises:

(1) A polarized light detection system I, comprising from the left to the right: a light source 1, a first wheel 2 with a coaxially mounted polarizer 3, an orthogonally mounted outer-ring and inner-ring dual analyzer 4 co-axially mounted on a side of a second wheel 5 with two photoelectric detectors 6, 7 on another side of the dual analyzer 4, a comparison amplifier 8 with two input terminals connecting to the output terminals of the photoelectric detectors 6, 7 respectively, a signal processing and control device 9 with an input terminal connecting to the output terminal of the comparison amplifier 8, a motor driver 10 with an input terminal connecting to the output terminal of the signal processing and control device 9, and a step motor 11 connected to the output terminal of the motor driver 10 and driving the second wheel 5 to rotate the dual analyzer 4;

(2) A polarized light detection system II, comprising from the left to the right a light source 12, a polarizer 13 co-axially mounted on a third wheel 14, a analyzer assembly 15 symmetrically distributed and co-axially mounted on a fourth wheel 16 with corresponding photoelectric detectors mounted on another side of the analyzer assembly 15, and a comparison amplifier 21 with a plurality of input terminals each connecting to the output terminal of a corresponding photoelectric detector while its output terminal is connecting to the signal processing and control device 9.

(3) The third wheel 14 is engaged with or frictionally coupled to the first wheel 2 to rotate the polarizer 13 mounted on it, and thus provided a turning angle between the polarizer 13 and the analyzer assembly 15 proportional to the displacement being measured.

The analyzer assembly 15 on the fourth wheel 16 is composed of four analyzers, each corresponding to a photoelectric detector 17, 18, 19 and 20.

Figure 2:
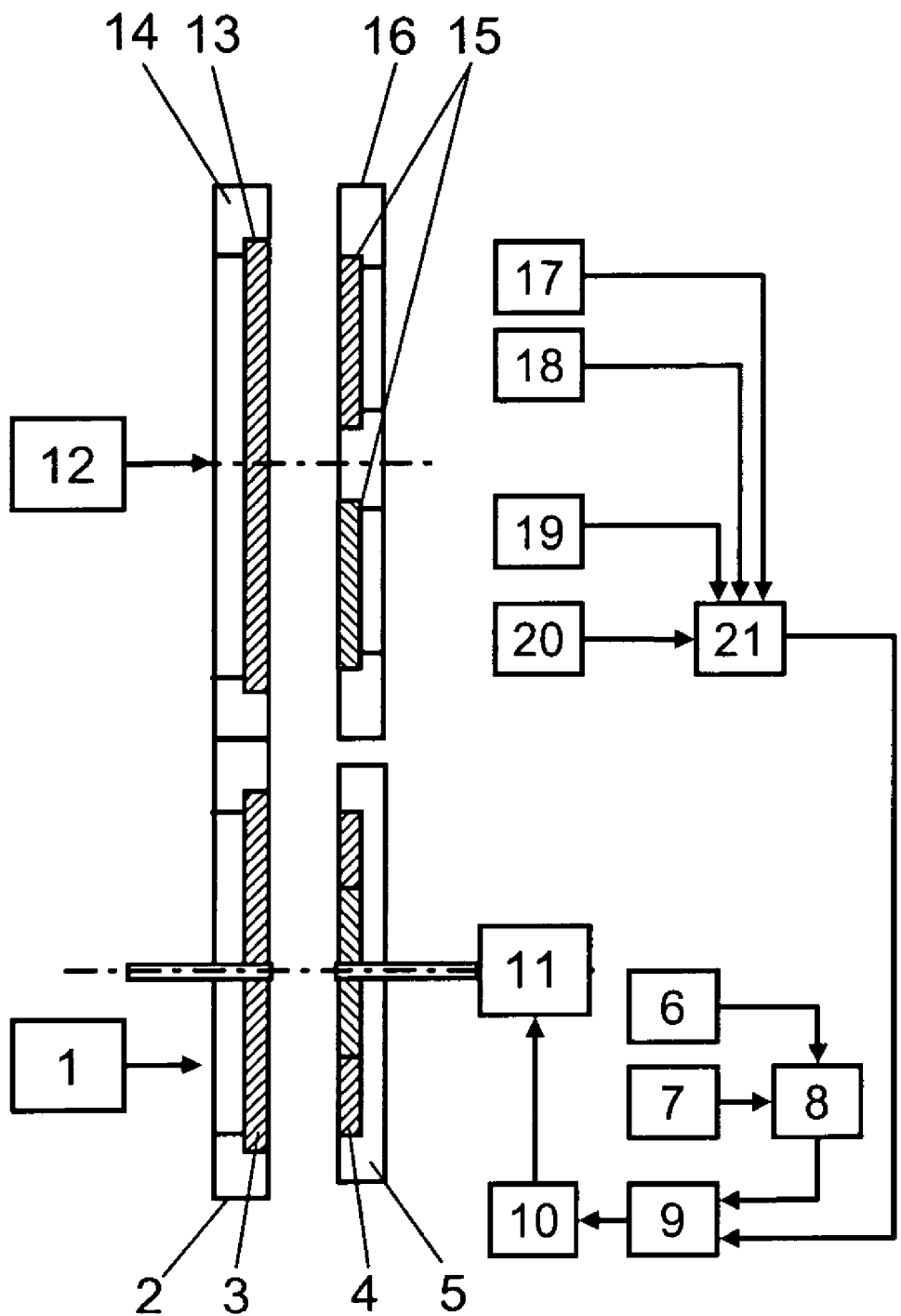
FIG. 2 illustrates a structure of an orthogonal differential servo-comparison system according to the present invention.

As shown in FIGS. 1 and 2, the linear displacement measured is converted mechanically to rotate the wheel 2. Consequently the polarizer 3 generates an angular displacement θ, the signal processing and control device 9 drives the step motor 11 via the motor driver 10 to rotate accordingly so that the wheel 5 and the concentric orthogonally mounted dual analyzer 4 are rotated for a same degree θ'. The displacement value can be obtained from the control pulse number of the step motor. The measuring process is described in detail as follows: The light source 1 emits a light beam; part of it passes through the polarizer 3 and the outer-ring analyzer of the concentric orthogonally mounted dual analyzer 4, and is received by the photoelectric detector 7. Another part of the light beam emitted by the light source 1 passes through the polarizer 3 and the inner-ring analyzer of the concentric orthogonally mounted dual analyzer 4, and is received by the photoelectric detector 6. Generally the light intensity received by the photoelectric detectors 6, 7 at the starting point (displacement beginning point) must be equal. At the dual analyzer 4, the polarization axis of the outer-ring analyzer is placed orthogonal to the polarization axis of the inner-ring analyzer.

As shown in FIG. 2, the electric signal outputs from the photoelectric detectors 6, 7 are connected to the comparison amplifier 8, a common analog operational amplifier. Photoelectric differential signal output from the comparison amplifier 8 is fed to the signal processing and control device 9 comprising an ordinary digital or analog circuit or a microprocessor. The signal processing and control device 9 is designed to control the step motor driver 10 and the step motor 11 to rotate for a degree $\theta'$ following the increase of $\theta$ till $\theta'=\theta$ according to the direction and magnitude of the signals.

Figure 3:
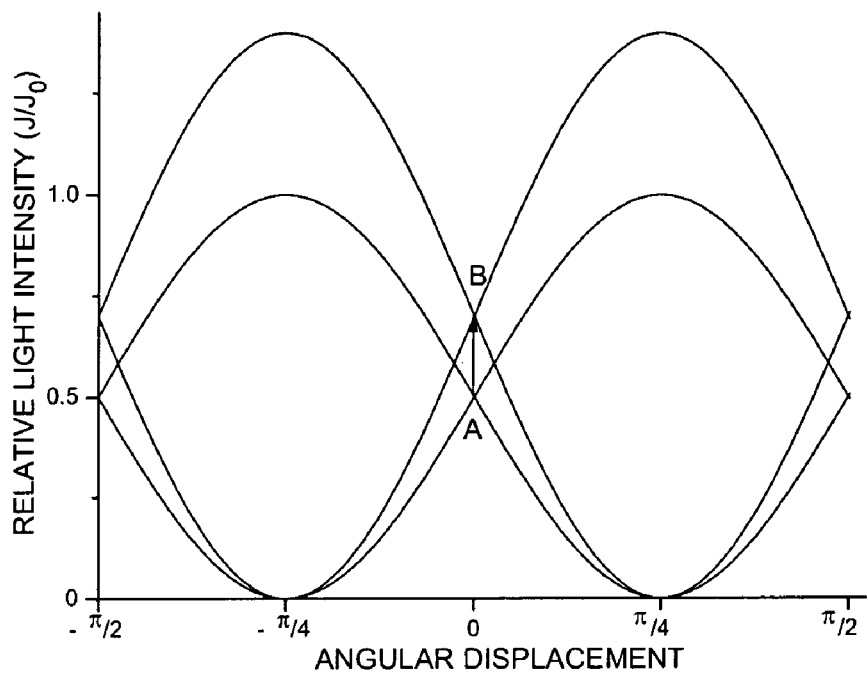
FIG. 3 illustrates the principle for the orthogonal differential comparison structure to resist light intensity drifting according to the present invention.

As shown in FIG. 3, the orthogonal differential comparison structure is resistant to light intensity drifting. From Equations 1 through 4, it can be seen that the orthogonal differential comparison servo control causes the working point to maintain on the intersection (Point A) of two Malus curves before occurrence of light intensity drifting, and the working point moves to a Point B upon occurrence of light intensity drifting but the traverse coordinate of the Point B remains same with the Point A. This means that the light intensity drifting does not affect the result of the displacement measuring.

As shown in FIG. 1, the orthogonally mounted dual analyzer 4 according to the present invention is composed of an outer-ring analyzer and an inner-ring analyzer, each with a polarization axis perpendicular to the other.

Referring to FIG. 1, the orthogonal differential light path and its components can fix the light source and photoelectric detectors so that they will not move following the rotation of the polarizer 3 and the analyzer 4. It eliminates the need of using brush or other similar device, and consequently assures reliable connection of the circuit. As shown in FIG. 1, the light source 1 and the photoelectric detectors 6, 7 are fixed on a component such as a mask which does not have direct relation with any moving part, and the two photoelectric detectors 6, 7 are mounted symmetrically aside the centre line of the light source 1.

Figure 4:
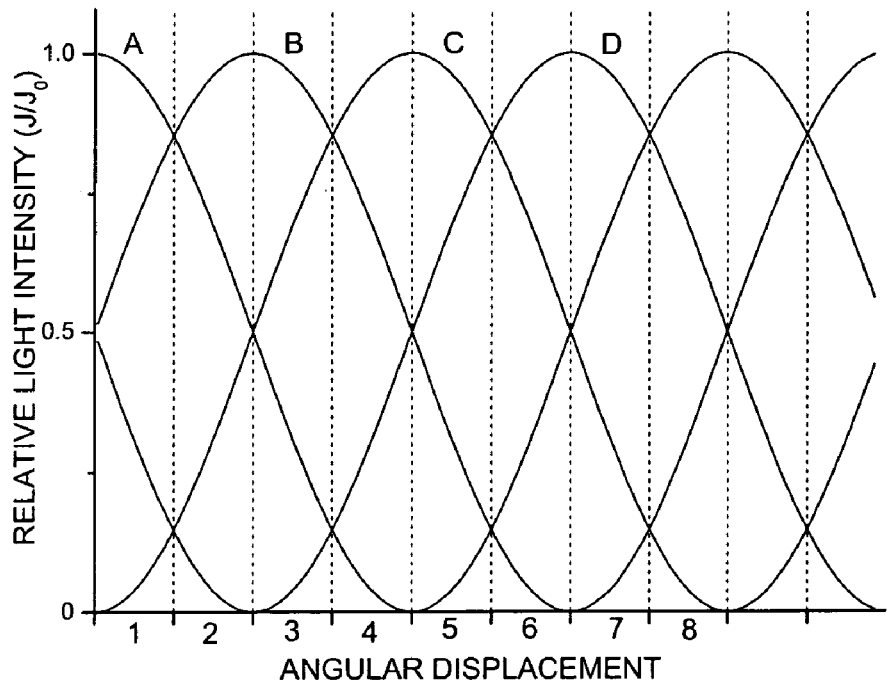
FIG. 4 illustrates the principle of the absolute displacement sensor using polarized light detection according to the present invention.

As shown in FIG. 1, the third wheel 14 and the first wheel 2 are engaged or frictionally coupled so that a turning angle proportional to the displacement to be measured is formed between the polarizer 13 and the analyzer 15 after rotation of the polarizer 13. The ratio of the radius or gear number of the third wheel 14 to the radius or gear number of the first wheel 2 is integral, such as 16:1. The preset included angle between the polarization axis of each analyzer 15 and the polarization axis of the polarizer 13 varies for a certain angle in each sequence (45° is shown in FIG. 4). Then, according to Malus Law, the output signals from the photoelectric detectors 17, 18, 19 and 20 are that shown in FIG. 4. Supposed the first intersection of the output signals from the photoelectric detectors 17, 18 is the start point for the displacement being measured, then when the first wheel 2 turns for 360°, the third wheel 14 is rotated for 22.5° where two certain output signals from the photoelectric detectors 17 through 20 are equal. Consequently, by comparing the magnitude of these four photoelectric output signals (see Table 1), the number of rotation of the first wheel 2 is ascertained, and thus the system has the capacity to detect absolute displacement, including discretional displacement during and after disconnection of electric power supply. For example, if the ratio of the radius or gear number of the third wheel 14 to the radius or gear number of the first wheel 2 is 16:1, the third wheel 14 turns 22.5° when the first wheel 2 turns for a rotation. That means that when the first wheel 2 turns for 180°, the third wheel 2 turns for 8 rotations within the range of measurement, which is corresponding to a very wide measuring range. During the first rotation of the third wheel 14, the relationship among the four photoelectric signals can satisfy $v_1 \geq v_2 \geq v_4 \geq v_3$, in which the curves A, B, C and D are corresponding to $V_1$, $V_2$, $V_3$, $V_4$ respectively. The relation among the photoelectric signals in other sections are shown in Table 1, the relation in the first rotation is repeated in the $9^{th}$ rotation.

Ascertaining the number of rotation through comparing the signals, the polarized light detection system II also has the capacity to resist light intensity drifting.

Table 1

| Section | Expression |
|---------|------------|
| 1 | $V_1 \geq V_2 \geq V_4 \geq V_3$ |
| 2 | $V_2 \geq V_1 \geq V_3 \geq V_4$ |
| 3 | $V_2 \geq V_3 \geq V_1 \geq V_4$ |
| 4 | $V_3 \geq V_2 \geq V_4 \geq V_1$ |
| 5 | $V_3 \geq V_4 \geq V_2 \geq V_1$ |
| 6 | $V_4 \geq V_3 \geq V_1 \geq V_2$ |
| 7 | $V_4 \geq V_1 \geq V_3 \geq V_2$ |
| 8 | $V_1 \geq V_4 \geq V_2 \geq V_3$ |

What is claimed is:

1. A method for optically measuring absolute displacement using a polarized light detection system I and a polarized light detection II, comprising:

with respect to polarized light detection system I, converting a linear displacement being measured by polarized light detection system I, using a mechanical device, to an angular displacement which consequently causes a first polarizer to rotate;

passing a light from a light source through the first polarizer and then two parts of a dual analyzer assembly to reach two photoelectric detectors; and controlling a step motor through comparison of the magnitude of light intensity signals from the said two photoelectric detectors to drive the dual analyzer to trace the rotation of the first polarizer so that the number of control pulses from the step motor becomes an accurate value for the displacement being measured in a single rotation; and with respect to polarization light detection system II, maintaining the rotation of a second polarizer proportional to the rotation of the first polarizer in the polarization light detection system I while a light from a light source is passing through the second polarizer and then an analyzer assembly wherein a certain included angle is formed between polarization axes of the adjacent analyzers of the analyzer assembly to reach a plurality of photoelectric detectors respectively so that the number of rotations of the first polarizer and step motor is ascertained, thereby measuring the absolute displacement in the polarized light detection system I.

2. An apparatus for optically measuring absolute displacement comprising:
- a polarized light detection system I comprising
  - a first light source,
  - a first wheel with a first polarizer coaxially mounted,
  - a second wheel with a co-axially mounted dual analyzer,
  - two photoelectric detectors,
  - a first comparison amplifier connected to the output terminals of the photoelectric detectors,
  - a signal processing and control device connected to the output terminal of the comparison amplifier,
  - a motor driver connected to the output terminal of the signal processing and control device, and
  - a step motor connected to the output terminal of the motor driver; and
- a polarized light detection system II comprising
  - a second light source,
  - a third wheel with a second polarizer co-axially mounted,
  - a fourth wheel with an analyzer assembly,
  - at least three photoelectric detectors,
  - a second comparison amplifier connected to the output terminals of these photoelectric detectors and
  - a signal processing and control device connected to the output terminal of the second comparison amplifier.

3. An apparatus for optically measuring absolute displacement according to claim 2, wherein the first wheel and the third wheel are engaged or frictionally coupled so that a turning angle proportional to the displacement measured is generated between the second polarizer and the analyzer assembly after rotation of the second polarizer.

4. An apparatus for optically measuring absolute displacement according to claim 2, wherein the second wheel and the first wheel are aligned and co-axially mounted.

5. An apparatus for optically measuring absolute displacement according to claim 2, characterized by the step motor connected to the output terminal of the motor driver and the second wheel for driving the second wheel and consequently driving the dual analyzer for rotation.

6. An apparatus for optically measuring absolute displacement according to claim 2, characterized by the dual analyzer comprising an outer ring and an inner ring, each with a polarization axis perpendicular to the other.

7. An apparatus for optically measuring absolute displacement according to claim 2, characterized by the two photoelectric detectors in system I one corresponding to the outer ring and another corresponding to the inner ring of the dual analyzer.

8. An apparatus for optically measuring absolute displacement according to claim 2, characterized by an analyzer assembly including N sets of analyzers in which N is at least three, and corresponding to N sets of photoelectric detectors respectively.

9. An apparatus for optically measuring absolute displacement according to claim 8, characterized by the N sets of analyzers each with a polarization axis mounted in a manner so that the included angle between each of these analyzers and the polarization axis of the polarizer on the third wheel is $0°$, $180°/N$, $2 \times 180°/N$, $3 \times 180°/N$, . . . , $(N-1) \times 180°/N$, respectively.

10. An apparatus for optically measuring absolute displacement according to claim 9, characterized by the analyzer assembly comprising analyzers symmetrically distributed on the fourth wheel.

11. An apparatus for optically measuring absolute displacement according to claim 9, characterized by four analyzers each with a polarization axis mounted in a manner so that the included angle between each of these analyzers and the polarization axis of the polarizer at the third wheel is $0°$, $45°$, $90°$ and $135°$ respectively.

* * * * *